US012808527B2

(12) United States Patent
Zuidema

(10) Patent No.: US 12,808,527 B2
(45) Date of Patent: Nov. 24, 2026

(54) COOLING FINGERS AS A SUSTAINABLE AND RELIABLE SOLUTION FOR LED DRIVERS

(71) Applicant: SIGNIFY HOLDING B.V., Eindhoven (NL)

(72) Inventor: Patrick Zuidema, Mierlo (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 19/164,648

(22) PCT Filed: Mar. 11, 2024

(86) PCT No.: PCT/EP2024/056327
§ 371 (c)(1),
(2) Date: Sep. 12, 2025

(87) PCT Pub. No.: WO2024/188921
PCT Pub. Date: Sep. 19, 2024

(65) Prior Publication Data
US 2026/0243416 A1 Aug. 20, 2026

(30) Foreign Application Priority Data
Mar. 16, 2023 (EP) .................................... 23162426

(51) Int. Cl.
*F21V 29/508* (2015.01)
*F21V 29/70* (2015.01)
*F21Y 115/10* (2016.01)

(52) U.S. Cl.
CPC ............ *F21V 29/508* (2015.01); *F21V 29/70* (2015.01); *F21Y 2115/10* (2016.08)

(58) Field of Classification Search
CPC ................................ F21V 29/508; F21V 29/70
See application file for complete search history.

(56) References Cited

U.S. PATENT DOCUMENTS

2007/0159799 A1 7/2007 Dando, III et al.
2010/0265709 A1* 10/2010 Liu .......................... F21K 9/00 362/249.02
2011/0006657 A1* 1/2011 Liu ......................... F21V 29/51 313/12

(Continued)

FOREIGN PATENT DOCUMENTS

WO 2022122470 A2 6/2022

*Primary Examiner* — Zheng Song

(57) ABSTRACT

The invention provides an electronic arrangement comprising an electrical arrangement and a thermally conductive element; wherein: the electrical arrangement comprises a support and a plurality of electrical components supported by the support, wherein each of the plurality of electrical components has an electrical component top defining a component height relative to the support; and the thermally conductive element comprises a first part and a plurality of extensions, extending from the first part and configured under first angles with the first part, wherein the first part and the plurality of extensions comprise a thermally conductive sheet-like element, wherein the thermally conductive sheet-like element comprises one or more thermally conductive layers; wherein the plurality of extensions are configured in thermal contact with one or more electrical component tops.

14 Claims, 5 Drawing Sheets

(56) References Cited

U.S. PATENT DOCUMENTS

| | | | |
|---|---|---|---|
| 2016/0076820 | A1 | 3/2016 | Lewis et al. |
| 2019/0200485 | A1 | 6/2019 | Coteus et al. |
| 2019/0242568 | A1 | 8/2019 | Luiten et al. |
| 2021/0392780 | A1 | 12/2021 | Adam et al. |
| 2022/0163268 | A1 | 5/2022 | Lewis et al. |

* cited by examiner

COOLING FINGERS AS A SUSTAINABLE AND RELIABLE SOLUTION FOR LED DRIVERS

CROSS-REFERENCE TO PRIOR APPLICATIONS

This application is the U.S. National Phase application under 35 U.S.C. § 371 of International Application No. PCT/EP2024/056327, filed on Mar. 11, 2024, which claims the benefit of European Patent Application No. 23162426.3, filed on Mar. 16, 2023. These applications are hereby incorporated by reference herein.

FIELD OF THE INVENTION

The invention relates to an electronic arrangement comprising an electrical arrangement and a thermally conductive element. The invention further relates to a light generating system comprising the electronic arrangement. The invention also relates to a lighting device comprising the light generating system. The invention additionally relates to a method of assembly of the electronic arrangement.

BACKGROUND OF THE INVENTION

The use of a heat sink apparatus in contact with a top surface of an electronic component is known in the art. For instance, US2007159799A1 describes a heat sink apparatus for electronic components provides a heat sink and a deformable, convex foil construction affixed to the heat sink around a periphery of the foil construction and adapted to extend away from the heat sink to enable deformation of the convex foil construction as a result of contact with a top surface of an electronic component mounted opposite the foil construction.

US209200485A1 discloses an assembled circuit board which has a topology that defines positions, dimensions and power dissipation of components mounted to the circuit board, including a high power component and one or more low power components. A cold plate makes thermal contact to the high power component through a thermal interface material. A thermally conductive sheet overlays the circuit board and is formed to match the topology of the low power component or components. The sheet has a first portion that makes thermal contact with the cold plate and a second portion that overlays the low power component or components. The cold plate removes heat directly from the high power component and indirectly through the thermally conductive sheet from the low power component or components. The thermally conductive sheet conforms to the topology of the low power components either by preforming or by flexibility.

SUMMARY OF THE INVENTION

Light generating systems may be accompanied by electronic arrangements, for example drivers, to power and/or control the light generating systems. Electrical components comprised by these electronic arrangements may generate heat over the course of their operation. Operating such electrical components at high temperatures may reduce the lifespan of the electronic arrangement and may also affect its performance. Hence, it is desired to provide thermal management for such electrical components. To this end, thermal potting materials (that are typically applied to arrangements in liquid form prior to curing into solid form, e.g. silicone-based materials with thermal conductive fillers or asphalt-based materials) and thermal interface materials (that are typically applied to arrangements in solid form, e.g. gap fillers) may be used to cool electrical components by guiding away heat. Such materials may typically have high thermal conductivity and may e.g. comprise epoxy, polyurethane, and/or a silicone compound. However, it may be challenging to remove potting materials and thermal interface materials as they may adhere to the electrical components. Therefore, these compounds and/or the (useful) electrical components may not be sustainable nor recyclable. Another cooling solution for electrical components may be thermal conductive pads. However, thermal conductive pads may be non-recyclable, heavy, and expensive. Further, due to the thermal expansion of thermal potting materials, thermal interface materials, and thermal conductive pads, electrical components may face a reduction in lifespan and/or performance because of shrink and/or expansion stresses.

It appears particularly desirable to provide a (more) sustainable cooling solution for electrical components. Hence, it is an aspect of the invention to provide an alternative electronic arrangement, which preferably further at least partly obviates one or more of above-described drawbacks. The present invention may have as object to overcome or ameliorate at least one of the disadvantages of the prior art, or to provide a useful alternative.

In a first aspect, the invention provides an electronic arrangement. The electronic arrangement may comprise an electrical arrangement. The electronic arrangement may especially comprise a thermally conductive element. In embodiments, the electrical arrangement may comprise a support. The electrical arrangement may especially comprise a plurality of electrical components. The plurality of electrical components may be supported by the support. Each of the plurality of electrical components may especially have an electrical component top. The electrical component top may define a component height ($H_C$) relative to the support. In embodiments, the thermally conductive element may comprise a first part. Further, the thermally conductive element may comprise a plurality of extensions (or: "fingers"). The plurality of extensions may especially extend from the first part. In particular, the plurality of extensions may be configured under first angles ($\alpha_1$) with the first part. The first part and the plurality of extensions may in embodiments comprise a thermally conductive sheet-like element. Especially, in embodiments the thermally conductive sheet-like element may comprise one or more thermally conductive layers. In some embodiments, the sheet-like element may comprise a foil. In other embodiments, the sheet-like element may comprise a vapor chamber. The plurality of extensions may in particular be configured in thermal contact with one or more electrical component tops. Therefore, in specific embodiments the invention may provide an electronic arrangement comprising an electrical arrangement and a thermally conductive element; wherein: the electrical arrangement comprises a support and a plurality of electrical components supported by the support, wherein each of the plurality of electrical components has an electrical component top defining a component height ($H_C$) relative to the support; and the thermally conductive element comprises a first part and a plurality of extensions, extending from the first part and configured under first angles ($\alpha_1$) with the first part, wherein the first part and the plurality of extensions comprise a thermally conductive sheet-like element, wherein the thermally conductive sheet-like comprises one or more thermally conductive layers; wherein the plurality of extensions are configured in thermal contact with one or more electrical component tops.

With the present invention, the thermally conductive element, especially the extensions (i.e., fingers) may be in thermal contact with an electrical component (through the electrical component top) and hence may facilitate the conduction of thermal energy (or: "heat") away from the electrical component. The thermally conductive element comprising thermally conductive sheet-like element may provide a (permanent) cooling solution of the electrical components as an integral part of an electronic arrangement. Especially, the thermally conductive sheet-like element may provide particularly reliable thermal management in an electronic arrangement. Thereby, the lifespan and performance of the electrical components may be improved. Such a thermally conductive element may be especially useful for electronic arrangements, such as e.g. for light emitting diode (LED) drivers. In particular, the thermal conductivity of the thermally conductive sheet-like element may even be higher than the thermal conductivity of known thermal potting materials and thermal interface materials. Hence, the cooling of the electrical components may be improved in the present invention. Further, the thermally conductive element may relatively easily be applied and removed from the electronic arrangement. The thermally conductive element may furthermore be (more) suitable for recycling. The thermally conductive element may therefore be a sustainable and recyclable element, especially relative to typical thermal potting materials and thermal interface materials. Hence, the thermally conductive element may be a suitable and sustainable replacement for thermal potting materials and thermal interface materials. Further, this may also allow for the reusing and/or replacing of one or more of the electrical components, as they may not be embedded in adhering material that is difficult to remove from the electrical components, without damage to the electrical component(s). Hence, the present invention may in particular provide in embodiments cooling fingers as a sustainable and reliable solution for (LED) drivers. Especially, the thermally conductive sheet-like element may comprise one or more of a (multi-layer) foil and a vapor chamber.

As indicated, in embodiments, the invention especially provides an electronic arrangement comprising an electrical arrangement and a thermally conductive element. Embodiments thereof will further be described below.

The electrical arrangement may in embodiments comprise a support. Especially, the support may comprise a structure supporting other components of the electrical arrangement. Such components may in general be coupled to and/or configured on the support. The support may in embodiments comprise one or more structural elements, especially a board. In certain embodiments, the support may comprise a printed circuit board ("PCB"). Yet, in embodiments, the support may comprise a main support and the PCB, which may be functionally coupled to the main support.

Especially, the support may be a structure upon which other elements may be coupled to or configured on. Furthermore, in embodiments, the electrical arrangement may comprise a plurality of electrical components functionally coupled to the support. Hence, the support may especially have features to accommodate the aforementioned electrical components. For instance, the support may comprise ports to connect to the electrical components. Especially, the electrical components may comprise electrodes or nodes which may be functionally coupled to the support. Here, functionally coupled may refer to securing the electrical components to the support such that the electrical components are secured in place with substantially no relative motion between the support and the electrical components. In embodiments, the electrical components may be electrically coupled to the support. That is, the electrical components may especially be connected to other electrical components via the support. Hence, alternatively or additionally, functionally coupled may refer to electrical contact of the electrical component with one or more electrically conductive tracks comprised by the support. Further, the electrical components may especially be connected to a power source via the support. In some embodiments, the power source may be configured on the support. However, alternatively the power source may in embodiments also be configured external to the support.

In embodiments, the electrical arrangement may comprise a PCB. Especially, the PCB may be functionally coupled to the support. Further, in embodiments, the electrical components may be electrically coupled to the PCB. As known in the art, a PCB may mechanically support and electrically connect electronic components or electrical components using electrically conductive tracks, pads and other features etched from one or more sheet layers of copper laminated onto and/or between sheet layers of a non-conductive substrate (shortly indicated as "track" or "conductive track"); though other options may also be possible. A PCB may comprise one or more electrically conductive tracks, which may e.g. comprise copper. When there are two or more electrically conductive tracks, two or more tracks may be electrically isolated from each other. In embodiments, two or more electrically conductive tracks may be electrically isolated from each other, but may be (temporarily) electrically connected to each other via one or more electrical component. The electrical connection may be temporary, when e.g. during operation a switch opens or closes an electrical connection. An electrical connection may e.g. be permanent, when e.g. an electrical component is configured electrically connected to two electrically conductive tracks. Hence, in embodiments a PCB may comprise an insulating layer arranged between a substrate and a conductive layer.

An (electronic) component, such as a solid stage light source, may generally be soldered onto the PCB to both electrically connect and mechanically fasten it to the PCB. For instance, a basic PCB may consist of a flat sheet of insulating material and a layer of copper foil, laminated to the substrate. Chemical etching divides the copper into separate conducting lines called tracks or circuit traces, pads for connections, vias to pass connections between layers of copper, and features such as solid conductive areas for EM shielding or other purposes. The tracks function as wires fixed in place, and are insulated from each other by air and the board substrate material. The surface of a PCB may have a coating that protects the copper from corrosion and reduces the chances of solder shorts between traces or undesired electrical contact with stray bare wires. For its function in helping to prevent solder shorts, the coating is called solder resist.

Hence, the shape of a PCB may in general be plate-like. Especially, in embodiments the PCB may have a length and a width and a height, wherein an aspect ratio of the length and the height is at least 5, like in the range of 5-5000, like 10-2500, and wherein an aspect ratio of the width and the height is at least 2, such as an aspect ratio of at least 5, like in the range of 5-5000, like 10-2500. The terms "length", "width", and "height" may also refer to "largest length", "largest width", and "largest height", respectively. The PCB may especially have a rectangular cross-section (such as a square cross-section). The height (or thickness) of the PCB may in embodiments be selected from the range of 0.2-10 mm, such as 0.5-5 mm, like 1-2 mm. The width of the PCB may in embodiments be selected from the range of 5-200 mm, such as 5-50 mm. The length of a single PCB area may in embodiments e.g. be selected from the range of 10-50 mm, such as 15-40 mm. The length of the PCB, including a plurality of (connected) PCB areas, may in embodiments e.g. be selected from the range of 20-2000 mm, such as 20-1500 mm. Other dimensions may be possible as well.

In embodiments, the board may comprise a rigid board or a semi-rigid board, especially a rigid board. In other embodiments, the board may comprise a semi-rigid board. In specific embodiments, the PCB may be flexible. In yet other embodiments, the PCB may be rigid. Especially, the support is a rigid support, such as a conventional PCB. In embodiments, the board may comprise a metal, especially a metal selected from the group comprising copper aluminum, tin, iron, silver and lead, more especially a metal selected from the group comprising copper and aluminum.

In further embodiments, the (printed circuit) board may have a thermal conductivity of at least 0.2 W/(m*K), especially at least 2 W/(m*K), such as at least 20 W/(m*K). The (printed circuit) board may further have a thermal conductivity of up to 400 W/(m*K), especially up to 350 W/(m*K), such as up to 300 W/(m*K). Thereby the (printed circuit) board may have a thermal conductivity selected from the range of 0.2-400 W/(m*K), especially from the range of 2-350 W/(m*K), such as from the range of 20-300 W/(m*K). Instead of "W/m*K" also the indications W/mK or W·m-1·K-1 may be applied.

In specific embodiments, the board may comprise a PCB. Especially, the board may comprise one or more of a CEM-1 PCE, a CEM-3 PCE, a FR-1 PCE, a FR-2 PCB, a FR-3 PCB, a FR-4 PCB, and aluminum metal core PCB, especially one or more of a CEM-1 PCB, a CEM-3 PCB, a FR-1 PCB, and a FR4 PCB and an aluminum metal core PCB, more especially one or more of a CEM-1 PCB, a CEM-3 PCB, a FR-1 PCB. In embodiments the PCB comprises a thermally conductive material, such as aluminum. Printed circuit boards comprising a metal core may also be indicated as insulated metal substrate (IMS).

An electrical component may be a component that (directly) converts the energy from an electrical current into another form of energy, e.g., heat, light, motion, etc. An electronic component is an electrical component that may (additionally or alternatively) control the flow of electrons from an electrical current. Herein, the term electrical component may especially refer to an electronic component. The electronic component may include an active or a passive electronic component. In embodiments, the electronic component may comprise a sub-PCB board (or additional PCB board) comprising one or more electronic components. An active electronic component may be any type of circuit component with the ability to electrically control electron flow (electricity controlling electricity). Examples thereof are diodes, resistors, etc. Examples are given further below. In yet other embodiments, the electronic component may include a passive electronic component. Components incapable of controlling current by means of another electrical signal are called passive devices. The term "electronic component" may also refer to a plurality of alike or a plurality of different electronic components. In embodiments, the electrical arrangement may comprise at least three, more especially at least four, such as at least 10 electrical components. In further embodiments, the electronic component may be selected from the group comprising a solid state light source, a driver, an electronic module, or a sensor.

Such electrical component may be an electrical component that during operation generates heat, such as e.g. a capacitor, an inductor, a voltage regulator, an amplifier circuit, an integrated circuit, a central processing unit, a microprocessor unit, a power transistor, a field-effect transistor ("FET", especially a metal-oxide semiconductor field-effect transistor ("MOS-FET")), a transformer, a resistor, or a diode. Moreover, such electrical components may be an electrical component that is sensitive to heat (i.e., affected in terms of lifespan and/or performance by high temperatures), such as e.g. a capacitor, a resistor, a diode (such as a crystal diode), or a sensor. The electrical components may further be any other heat-dissipating electrical components. In embodiments comprising a PCB, such electrical components may be functionally and electrically coupled to the PCB.

In embodiments, the plurality of electrical components functionally coupled to the support may be protruding from the support. In embodiments, the support may comprise a first face and a second face. Especially, the first face and the second face may face in opposite directions. The plurality of electrical components may be configured at the first face. In certain embodiments, additionally one or more electrical components may be configured at the second face. In other embodiments, no electrical components may be configured at the second face. Hence, in embodiments, the electrical components functionally coupled to the support may protrude from the support plane to a (component) height ($H_C$). The component height $H_C$ may be defined relating to the face of the support from which the component protrudes. In embodiments, the component height $H_C$ may be defined by an electrical component top relative to the support (i.e. relative to the first face when the electrical component is configured at the first face). The electrical component top may especially be the part of the electrical component that is most distant in a perpendicular direction from the (respective) face of the support from which the electrical component protrudes. The electrical component top may comprise a surface, a line (defined by an edge), and a point (of a tip). Further, surface or line top may be parallel to the support or may be inclined (in general, however, essentially parallel). Thereby, each of the plurality of electrical components may especially have an electrical component top defining a component height $H_C$. The component height $H_C$ may be measured in a perpendicular direction from a support plane to an electrical component top, which may be defined on the support from which the electrical components protrude. Note that in embodiments, each of the electrical components may have a unique component height $H_C$ different from the other electrical components. Hence, two or more electrical components may especially have different component heights $H_C$. Especially, at least two of the electrical components may have different component heights $H_C$ relative to the support (i.e., the support plane). More especially at least three of the electrical components may have different component heights $H_C$ relative to the support (i.e., the support plane). Further, in embodiments two or more electrical components may also have essentially the same component heights $H_C$. The electrical components may be defined by one or more further component dimensions $X_C$ such as a component width $W_C$, a component length $L_C$ and a component diameter $d_C$.

Thereby, in embodiments, the electrical arrangement may comprise a support and a plurality of electrical components supported by the support. Especially, in certain embodiments, the support may comprise a PCB. The plurality of electrical components may be electrically coupled to the PCB. Further, in embodiments, each of the plurality of electrical comments may have an electrical component top defining a component height $H_C$ relative to the support. The plurality of electrical components may have at least one component dimension ($X_C$). Moreover, in specific embodiments, one or more of the plurality of electrical components may be selected from the group comprising a capacitor, an inductor, a voltage regulator, an amplifier circuit, an integrated circuit, a central processing unit, a microprocessor unit, a FET, a MOSFET, a transformer, a resistor, a diode, a sensor, and a transistor.

In embodiments, the thermally conductive element may refer to a straight and/or curved thermally conductive element. Especially, the thermally-conductive element may comprise a thermally conductive element with straight parts and/or curved parts. In particular, the thermally conductive element may comprise a plurality of parts, such as a first part and a plurality of extensions (extending relative to the first part). The first part may in embodiments be a straight and/or curved part. The first part may preferably be a straight part, but may be curved to conform to e.g. the support or a housing. The plurality of extensions may be straight and/or curved extensions, preferably straight extensions. In embodiments, the plurality of extensions may extend from the first part. The plurality of extensions may especially be configured relative to the first part. Thereby, the plurality of extensions may be configured under first angles ($\alpha_1$) with the first part. The first angles ($\alpha_1$) may be selected from the range of 45-135°, such as 65-115°, especially, 85-95°. Most especially, the first angles may be (essentially) 90°. However, other first angles are herein not excluded. Especially, the first angle ($\alpha_1$) may be defined in a plane perpendicular to the support.

The thermally conductive element may in embodiments comprise a thermally conductive sheet-like element. Especially, the first part and the plurality of extensions may comprise a thermally conductive sheet-like element. In specific embodiments, the thermally conductive element comprises a monolithic body comprising the first part and the plurality of extensions. The plurality of extensions may comprise at least two extensions, such as at least three extensions, especially at least five extensions, more especially at least ten extensions.

Herein, in embodiments the thermally conductive sheet-like element may be a straight and/or curved thermally conductive sheet-like element. The thermally-conductive sheet-like element may in embodiment have a large aspect ratio of outer surface area (divided by two) compared to thickness. An aspect ratio of the outer surface area (divided by two) of the thermally conductive sheet-like element (assuming in a planar and not bent or folded state) may be at least 2, like in the range of 2-5,000,000, such as 200-1,000,000. The thermally conductive sheet-like element may especially have a rectangular cross-section (such as a square cross-section). The thickness of the thermally conductive sheet-like element (i.e. of in embodiments the (multi)layer thermally conductive foil or the vapor chamber) may in embodiments be selected from the range of 50-10,000 μm, such as 50-5,000 μm, such as 100-3,000 μm, especially 200-2,000 μm.

Thereby, the thermally-conductive sheet-like element may in embodiments comprise a sheet, a foil, a plate, a (vapor) chamber, or a panel. Especially, the thermally-conductive sheet-like element may in embodiments comprise a thermally conductive foil or a thermally conductive (vapor) chamber. In general, the first part and the plurality of extensions may comprise the same type of thermally conductive sheet-like element, e.g., a thermally conductive foil. However, in certain embodiments, the first part and the plurality of extensions may comprise different types of thermally conductive sheet-like element, e.g., a first part comprising a thermally conductive (vapor) chamber and a plurality of extensions comprising a thermally conductive foil. Such thermally conductive foil or thermally conductive (vapor) chamber will be described further below.

The thermally conductive sheet-like element may in embodiments comprise a single thermally conductive layer. In other embodiments, the thermally conductive sheet-like element may in specific embodiments comprise a layered sheet-like element, i.e., a thermally conductive sheet-like element comprising layers, especially thermally conductive layers. In certain embodiments, the thermally conductive sheet-like element may comprise a single layer. However, in further embodiments, the thermally conductive sheet-like element may comprise a plurality of thermally conductive layers, such as two or more thermally conductive layers, especially three or more thermally conductive layers. A plurality of thermally conductive layers may comprise at least two or more different types of thermally conductive layers, e.g., one metal layer and one thermoplastic polymer layers. In other embodiments, a plurality of thermally conductive layers may comprise at least two or more of the same type of thermally conductive layers, e.g., two metal layers. In embodiments, the thermally conductive sheet-like element may (essentially) comprise a stack of a plurality of subsequently arranged separate thermally conductive layers.

The one or more thermally conductive layers comprised by the sheet-like element may have (substantially) similar dimensions, especially the external surface area, to the thermally conductive sheet-like element. The thickness of the one or more thermally conductive layers may in embodiments be selected from the range of 10-2,000 μm, such as 20-1,000 μm, especially 50-500 μm.

The thermally conductive element may transfer heat from a hotter element to a cooler element and/or to air. The thermally conductive element may thus especially facilitate thermal conduction between a plurality of elements comprised by the electronic arrangement, e.g., between an electrical component and another (cooler) part of the electronic arrangement. Further, the thermally conductive element may facilitate thermal conduction between one or more elements comprised by the electronic arrangement and elements (e.g., air) outside of the electronic arrangement. For that purpose, the thermally conductive element, especially the thermally conductive sheet-like element, may have thermally conductivity. The thermally conductive element may have a thermal conductivity of at least 0.05 W/(m*K), such as at least 0.2 W/(m*K), especially at least 1 W/(m*K). The thermally conductive element may have a thermal conductivity of up to 500 W/(m*K), such as up to 300 W/(m*K), especially up to 200 W/(m*K). Thereby, the thermally conductive element may have a thermal conductivity selected from the range of 0.05-500 W/(m*K), such as from the range of 0.2-300 W/(m*K), especially from the range of 1-200 W/(m*K). Hence, the thermally conductive element may be an effective conductor of heat (away from the electrical components). A thermally conductive element may especially have a thermal conductivity of at least about 10 W/(m*K), more especially at least about 20 W/(m*K), like at least about 30 W/(m*K), such as at least about 100 W/(m*K), like especially at least about 200 W/(m*K).

However, lower thermal conductivities may also be usable to transfer heat away (e.g., from an electrical component).

In embodiments, the thermal conductivity of the first part and the plurality of extensions may be (essentially) equal. However, in specific embodiments, the difference in thermal conductivity may be (substantially) different, e.g., the ratio in thermal conductivity of the first part to the plurality of extensions may be selected from the range of 1:3-3:1, especially 1:2-2:1.

Different electrical components and different functional activities may generate heat at different rates. The increase in temperature (or: "production of heat") of the electrical component may be at least 10° C., such as by at least 30° C., especially by at least 50° C. Further, the increase in temperature of the electrical component may be up to 80° C., such as up to 100° C., especially up to 120° C. Some electrical components and functional activities may not result in a (substantial) increase in temperature of the electrical component. The increase in temperature of the electrical component may thus be (essentially) 0° C., such as 0.1° C., especially 1° C. Therefor the increase in temperature of an electrical component may depend on the type of electrical component and the type of functional activity it performs. The temperature of an electrical component may further be affected by temperature increases caused by another electrical component and functional activity in direct physical contact or in close proximity (e.g., within 100 μm, especially within 1 mm). Therefore, in embodiments, the thermally conductive element may be configured to lead heat away from the electrical arrangement, especially from the electrical components. This may be facilitated by configuring the thermally conductive element in thermal contact with the electrical arrangement, especially with the electrical components thereupon. An element may be considered in "thermal contact" with another element if it can exchange thermal energy. Thereby, the elements may be thermally coupled. In embodiments, thermal contact can be achieved by direct physical contact between two elements. Thermal contact may also be achieved between two elements when the two elements are arranged relative to each other at a distance of equal to or less than about 10 μm, though larger distances, such as up to 100 μm may be possible. The shorter the distance, the better the thermal contact. Especially, the distance may be 10 μm or less, such as 5 μm or less, especially 1 μm or less. The distance may be the measured between two respective surfaces of the respective elements. The distance may be an average distance. For instance, the two elements may be in physical contact at one or more, such as a plurality of positions, but at one or more, especially a plurality of other positions, the elements are not in physical contact. For instance, this may be the case when one or both elements have a rough surface. Hence, in embodiments in average the distance between the two elements may be 10 μm or less (though larger average distances may be possible, such as up to 100 μm). Therefore in embodiments, the thermally-conductive element (i.e. the first part and/or the extensions) may be arranged in physical contact and thermal contact with a surface of another element in the electronic arrangement.

By configuring the thermally conductive element, especially the plurality of extensions, in thermal contact with the electrical arrangement, especially with the electrical component tops, heat may be guided away effectively (from the electrical components). In embodiments, heat from the electrical components may be absorbed by the thermally conductive element. Further, heat from the electrical components may be exchanged with another material (and/or air) that is in thermal contact with the thermally conductive element. For example, heat may be exchanged with a gas, such as ambient air, that is in thermal contact with the thermally conductive element. Furthermore, in certain embodiments, the thermally conductive element, especially the first part may be configured in thermal contact with another part of the electronic arrangement, e.g., the housing. Thus the heat from the electrical components may be guided away to other elements of the electronic arrangement and/or outside of the electronic arrangement. Hence, the thermally conductive material may facilitate safe, effective and durable operation of the electronic arrangement by providing thermal conduction of heat away from electrical components. Further, herein the phrase "thermally conductive element in thermal contact with the electrical arrangement", and similar phrases, may in embodiments especially refer to the thermally conductive element, especially the plurality of extensions in physical contact with the electrical arrangement, especially at least one of the electrical components.

Especially, in the present invention, the thermally conductive element may additionally be configured in thermal contact with the PCB. Especially, the thermally conductive element (in particular the plurality of extensions) may be configured in thermal contact with one or more of the electrical components coupled to the PCB. Further, the thermally conductive element (especially the first part) may be configured in thermal contact with ambient air (or another gas present). Hence, the thermally conductive element may guide heat away from critical parts of the PCB. Thus in embodiments, the thermally conductive element may be configured in thermal contact with the PCB.

Further, the thermally conductive element may be relatively lightweight compared to typical cooling solutions (e.g., thermal potting materials) and thereby applicable for inclusion in an electronic arrangement. Thereby, the thermally conductive element may be particularly suitable to provide durable electronic arrangements with an improved lifespan, especially providing a sustainable and reliable cooling solution for LED drivers.

Therefore, in embodiments, the thermally conductive element may comprise a first part and a plurality of extensions. The plurality of extensions may be extending from the first part. The plurality of extensions may be configured under first angles ($\alpha_1$) with the first part. Further, in embodiments, the first part and the plurality of extensions may comprise a thermally conductive sheet-like element. The thermally conductive sheet-like element may comprise one or more thermally conductive layers. Moreover, in embodiments, the plurality of extensions may be configured in thermal contact with one or more electrical component tops.

In further embodiments, the thermally conductive sheet-like element may especially comprise a thermally conductive foil. A thermally conductive foil may be a relatively thin sheet-like element structure, having in embodiments a thickness selected from the range of 10-600 μm, such as 100-500 μm, especially 200-400 μm. The thermally conductive foil may comprise at least three thermally conductive layers. The at least three thermally conductive layers may comprise one or more inner layers. The at least three thermally conductive layers may further comprise two outer layers. The two outer layers may be configured sandwiching the one or more inner layers.

The one or more inner layers may be especially selected for high thermal conductivity, i.e., the one or more inner layers may have a thermal conductivity of at least 10 W/(m*K), such as at least 50 W/(m*K), especially at least 100 W/(m*K). The one or more inner layers may have a thermal conductivity of up to 800 W/(m*K), such as up to 500 W/(m*K), especially up to 200 W/(m*K). Thereby, the thermal conductivity of the one or more inner layers may be higher relative to the thermal conductivity of typical cooling materials, e.g., thermal potting materials and thermal interface materials, which may for example be in general in the range of 1-6 W/(m*K). Therefore the one or more inner layers may comprise one or more of a carbon material, a metal material, and a ceramic material. Especially, each of the one or more inner layers may comprise one or more of a carbon material, a metal material, and a ceramic material.

A carbon material may especially be a crystalline carbon material. Most especially, the carbon material may comprise one or more of graphite and graphene. The carbon material may herein be provided as a carbon layer. A carbon layer may have particularly suitable thermal conductivity properties for the present invention such as selected from the range of 80-200 W/(m*K), especially about 150 W/(m*K).

A metal material may in embodiments comprise one or more of a metal, especially copper, aluminum, and/or iron. The metal material may in particular be provided as a metal layer or as an alloy layer. A metal material layer may have particularly suitable thermal conductivity properties for the present invention e.g., a copper metal layer may have a thermal conductivity selected from the range of 300-450 W/(m*K), such as about 398 W/(m*K). Further, an aluminum copper metal layer may e.g. have a thermal conductivity selected from the range of 200-300 W/(m*K), such as about 237 W/(m*K).

A ceramic material may in embodiments be selected from one or more of a boron nitride (BN) material, a silicon nitride (SiN) material, an aluminum nitride (AlN) material, a silicon carbide (SiC) material and aluminum oxide (AlO). In a certain embodiment, the ceramic material may especially be selected from BN material and/or AlN material. In particular, the ceramic material may be hexagonal BN material. A ceramic layer may have particularly suitable thermal conductivity properties for the present invention e.g., a (hexagonal) BN ceramic layer may have a thermal conductivity selected from the range of 400-760 W/(m*K), such as about 550 W/(m*K). Further, an AlN ceramic layer may e.g. have a thermal conductivity selected from the range of 200-450 W/(m*K), such as about 320 W/(m*K).

Additionally, the one or more inner layers may provide additional benefits to the electronic arrangement. The one or more inner layers may especially have relatively low thermal inertia and high thermal tolerance. Thereby, the one or more inner layers may rapidly facilitate conduction of thermal change and be applicable in electronic arrangements reaching high temperatures. A carbon layer or a metal material layer may be malleable and therefor applicable for configuring the plurality of extensions from a first part. Further, a carbon layer or a ceramic layer may have relatively low density and relatively low electrical conductivity. Such additional benefits may especially make the one or more inner layers applicable for use in electronic arrangements of the present invention.

In embodiments, the two outer layers may sandwich the one or more inner layers. The two outer layers may be selected for their capacity to (i) shield the one or more inner layers from external factors (from internal or external of the electronic arrangement), (ii) be relatively malleable such that the thermally conductive sheet-like element can be adjusted to an electronic arrangement, and (iii) adhere to other components of the electronic arrangement. The two outer layers may further be selected to have a thermal conductivity of at least 0.1 W/(m*K), such as at least 0.5 W/(m*K), especially at least 1 W/(m*K). Thereby, the two outer layers may facilitate the shaping and adhering of at least part of the thermally conductive element while providing thermal exchange between the one or more inner layers and components of the electrical arrangement. In specific embodiments, a patch (or: “area”) of one or more of the two outer layers may be removed such as to provide direct thermal contact between the one or more inner layers and another element of the electronic arrangement. For example, a patch of one outer layer may be removed on one of the plurality of extensions such as to provide direct thermal contact between the one or more inner layers and the electrical component top. The two outer layers may comprise a thermoplastic polymer material. Especially, the thermoplastic polymer material may comprise one or more polymers selected from polyimide, polyamide, polystyrene, and polyurethane. Most especially, the thermoplastic polymer material may comprise a polyimide material. The two outer layers may in general comprise the same type of material. In some embodiments, the two outer layers may comprise two different materials.

Therefore, in certain embodiments, the thermally conductive sheet-like element may comprise a thermally conductive foil. The thermally conductive foil may comprise at least three thermally conductive layers. In such embodiments, the three thermally conductive layers may comprise one or more inner layers. The one or more inner layers may have a thermal conductivity of at least 80 W/(m*K). The one or more inner layers may comprise one or more of (i) a carbon material, (ii) a metal material, and (iii) a ceramic material. Further, in such embodiments, the three thermally conductive layers may comprise two outer layers sandwiching the one or more inner layers. The two outer layers may comprise a thermoplastic polymer material. Especially, the thermoplastic polymer material may comprise a polyimide.

In other embodiments, the thermally conductive sheet-like element may comprise a vapor chamber (or other two-phase cooling device). A thermally conductive (vapor) chamber may be a relatively thick sheet-like element structure, having in embodiments a thickness selected from the range of 500-10,000 μm, such as 500-5000 μm, like at least 1 mm. In specific embodiments, the thickness of the vapor chamber (or other two-phase cooling device) may be selected from the range of 500-5,000 μm, such as 800-4,000 μm, especially 1,000-2,000 μm. A vapor chamber is an embodiment of a two-phase cooling device. Two-phase cooling devices may be devices that transfer heat between two locations based on both thermal conductivity and phase transition. In particular, liquid, such as water (e.g. for a copper device) or acetone (e.g. for an aluminum device), may be added to the two-phase cooling device and the two-phase cooling device may be vacuum sealed. When heat is applied to one area of the two-phase cooling device, the liquid may turn to vapor and move to an area of lower pressure where it cools and returns to liquid form whereupon it moves back to the heat source.

In particular, the vapor chamber element may include two essentially planar plates at a relative short distance (such as up to 5 mm). Further, for the vapor chamber element the hot spot may relatively freely be chosen.

The two-phase cooling device may have two thermally conductive envelope layers, especially wherein the two envelope layers defines an elongated chamber. In particular, the two envelope layers may enclose the chamber. The two envelope layers may generally be airtight. The two envelope layers may especially comprise a thermally conductive material selected from the group comprising copper, aluminum, stainless steel, titanium, nickel, Monel, tungsten, niobium, tungsten, molybdenum and Inconel. In particular, a medium temperature two-phase cooling device may comprise nickel, and a high temperature two-phase cooling device may comprise one or more of Monel, tungsten, niobium, molybdenum and Inconel. In embodiments, also material combinations, of e.g. two or more metals, may be applied, such as alloys. A two-phase cooling device configured for functional coupling to a luminescent body may especially have a device wall comprising a thermally conductive material selected from the group comprising copper, aluminum, stainless steel, nickel and titanium, which may be particularly suitable for the operational temperatures of such a system.

In further embodiments, the two envelope layers may comprise a material with low thermal expansion coefficient, especially a ceramic material, more especially (quartz) glass.

In particular, a low thermal expansion coefficient may result in a lower mechanical stress, which may in turn enable (locally) reducing the thickness further. For instance, quarts glass may have a thermal expansion close to 0 allowing to heat the quartz glass at one side and extremely cool it down on the other side without destroying the glass, which may facilitate obtaining a smaller ΔT.

The vapor chamber may especially be an elongated chamber, especially wherein an axis of elongation of the chamber is perpendicular to the contact region. The device axis may especially be parallel to the axis of elongation of the chamber. Vapor chambers are two-phase devices used as thermal management solutions. In general, vapor chambers may be composed of flat heat pipes with very high thermal conductance, having flat surfaces on the top and bottom sides. When compared to traditional solutions like copper heat spreaders, vapor chambers have many strengths. First, they have a higher thermal conductivity. Second, the density of the vapor chamber is much lower than that of copper. Because of its hollow structure, vapor chambers are much lighter than those made of copper. These properties make them stand out as ideal thermal management solutions. A vapor chamber may have a metal enclosure comprised by the two envelope layers that is vacuum sealed, an internal wick structure installed inside, and a working fluid that moves within the system thanks to capillary action. In detail, the heat source (especially part of the electrical arrangement, such as the electrical component tops) may make direct contact with a portion of the vapor chamber (through one of the plurality of extensions) and an optional finned heat sink attached to the top of the two envelope layers. Some of the working fluid may vaporize and flow to cooler areas. Heat absorption causes the vapor to condense and return to liquid which is reabsorbed by the wick structure and distributed to the heat source. As for the most common configuration, a vapor chamber houses vapor within a chamber. The vapor chamber may be a planar heat pipe, which can spread heat in two dimensions, using its entire body to cool the heat source. In embodiments, the vapor chamber may be a straight and/or a curved planar chamber. In embodiments, its flat structure may allow heat to be transferred evenly through a very small space. A vapor chamber may basically be considered as a flat heat pipe. Vapor chambers may usually be composed of thin plates having precisely formed grooves and a wick structure sealed together. They may also be filled with a small amount of fluid, such as de-ionized water, which may allow heat to be dispersed away from the source. Strengths of a vapor chamber may be: high conductance, capable of transferring a large amount of heat, can be made very thin, the heat transfer can stay efficient even when a heat source is high, the planate structure is capable of diffusing heat instantaneously, even for a large area, excellent heat transport efficiency for dissipating heat. Vapor chambers especially spread heat.

Herein, the thermally conductive (vapor) chamber may comprise two thermally conductive layers. The two thermally conductive layers may comprise two envelope layers. The two envelope layers may be configured enclosing a chamber volume comprising the working fluid and optionally one or more wick structures. At least parts of both thermally conductive layers may be configured parallel, providing the thermally conductive sheet-like element.

Herein, the vapor chamber may comprise a first part and a plurality of extensions configured under first angles ($\alpha_1$) with the first part. In some embodiments, the vapor chamber may comprise a single chamber volume in the first part and the plurality of extensions. In other embodiments, the first part may comprise a single chamber volume, and the plurality of extensions may comprise further chamber volumes.

Therefore, in certain embodiments, the thermally conductive sheet-like element may comprise a vapor chamber. The vapor chamber may comprise two thermally conductive layers, which may be configured parallel. Hence, a vapor chamber wall, defining a volume of the vapor chamber, may substantially be defined by the two thermally conductive layers. In embodiments, the vapor chamber may further comprise a working fluid. In embodiments, the working fluid may have a boiling point selected from the range of 55-105° C. Further, in such embodiments, the vapor chamber may comprise one or more wick structures. The one or more wick structures may have a thermal conductivity of at least 80 W/(m*K). Moreover, in such embodiments, the two thermally conductive layers may comprise two envelope layers substantially enclosing volume of the vapor chamber, which volume may comprise the working fluid and the one or more wick structures.

In specific embodiments, the plurality of electrical components may be arranged on the support. Especially, the plurality of electrical components may be arranged protruding from a first face on the support. The arrangement of electrical components may be defined by the component distance de from the first part of the thermally conductive element. Each of the plurality of electrical components may thereby have a component distance $d_C$. In certain embodiments, an electrical component may have multiple component distances ($d_{C1}$, $d_{C2}$, etc.) from different sections of the first part. Further, the plurality of extensions may be defined by an extension length ($L_E$) from the first part. Especially, each of the plurality of extensions may have an extension length ($L_E$) defined by their extension from the first part.

In embodiments, $L_E$ may be greater than $d_C$. That is, each of the plurality of extensions must at least extend beyond the component distance of at least one electrical component to be in thermal contact with an electrical component top (of that electrical component). Further, in specific embodiments, $L_E$ may be the smallest length required to bridge the distance between the first part and the electrical component top, such as to be in thermal contact with the electrical component top. With such configuration, an extension may be optimally configured to cover the distance between the first part and an electrical component and be in thermal contact with the electrical component top.

Therefore, in embodiments, the plurality of electrical components may be arranged on the support at a component distance ($d_C$) from the first part. Further, in embodiments, the plurality of extensions may have an extension length ($L_E$) from the first part. Moreover, in certain embodiments, $L_E$ may be selected from $d_C<L_E\leq d_C+H_C+X_C$.

In further embodiments, one or more of the plurality of extensions may be configured in thermal contact with two or more electrical components, such as three or more electrical components, especially four or more electrical components. Thereby, a single extension may provide thermal exchange between two or more electrical components and the thermally conductive element. Such configuration may provide improved efficiency of the thermal exchange and minimize the number of extensions required. In such configuration, the component distance $d_C$ used for the extension length $L_E$ is taken from the electrical component with the largest component distance de from the first part, specifically, the electrical component with the largest component distance de from the segment of the first part from which the extension extends.

In certain embodiments, the two or more electrical components may (substantially) have the same component height ($H_C$). In specific embodiments, the two or more electrical components may be arranged with increasing component height ($H_C$) along increasing component distance ($d_C$) from the first part. In other embodiments, the two or more electrical components may be arranged with decreasing component height ($H_C$) along increasing component distance ($d_C$) from the first part. Such configurations may provide a minimal distance required to be covered by an extension to provide effective thermal exchange for the two or more electrical components.

In yet further embodiments, at least one extension of the plurality of extensions extends from the first part along an axis of elongation ($A_E$). The axis of elongation ($A_E$) may especially be defined by a second angle ($\alpha_2$) relative to the first part. The second angle ($\alpha_2$) of an extension may be selected from the range of 45-135°, such as 65-115°, especially, 85-95°. If the second angle ($\alpha_2$) of an extension is not (substantially) 90°, the at least one extension may be provided with a crease area or bent area. The at least one extension may be creased or bent to provide the second angle ($\alpha_2$). Hence, such creased or bent extension may facilitate improved flexibility for the thermally conductive element to be applicable to different configurations of electrical components on the support. A subset of electrical components may especially be arranged on the support along the axis of elongation ($A_E$) of the at least one extension. In other configurations, a subset of electrical components may be arranged orthogonal to the axis of elongation ($A_E$) of the at least one extension. The electrical component tops of the subset of electrical components may be configured in thermal contact with the at least one extensions. Therefore, in certain embodiments, one or more of the plurality of extensions may be configured in thermal contact with two or more electrical component. Especially, in further embodiments, at least one extension of the plurality of extensions may extend from the first part along an axis of elongation ($A_E$). The axis of elongation ($A_E$) may have a second angle ($\alpha_2$) relative to the first part. In such embodiments, a subset of the plurality of electrical components may be arranged on the support along the axis of elongation ($A_E$). The electrical component tops of the subset of electrical components may be configured in thermal contact with the at least one extensions. Especially, the second angle ($\alpha_2$) may be defined in a plane parallel to the support.

The electrical arrangement and the thermally conductive element may in embodiments be enclosed by a housing. The housing may at least partly enclose the electrical arrangement and the thermally conductive element. Especially, the housing may (essentially) entirely enclose the electrical arrangement and the thermally conductive element. In specific embodiments, the thermally conductive element, especially the first part, may also be in thermal contact with the housing. For instance, the arrangement of the housing with the electrical arrangement and thermally conductive element may comprise a housing for a driver for e.g. a light generating device (see also below). In embodiments, the housing may comprise one or more housing walls. The support may be arranged on one of the walls of the housing. However, in other embodiments, the support may also be arranged away from the walls of the housing. The one or more housing walls may comprise one or more interior wall faces. The support may be arranged such that at least part of it is facing one or more interior wall faces (and not an exterior wall face). The one or more housing walls may especially form the housing. Further, in certain embodiments, the housing may comprise a housing bottom. The support may especially be arranged parallel to the housing bottom. The housing bottom may further comprise an interior bottom face. The support may be arranged such that at least part of it is facing the interior bottom face (and not an exterior bottom face). The one or more housing walls and housing bottom may especially form the housing. Therefore, the one or more interior wall faces and the interior bottom face together may define an interior housing surface area ($A_H$). The housing may in specific embodiments comprise a covering, such as a lid. The covering may be configured to allow opening and closing of the housing such that the interior of the housing may be accessed. A housing wall may comprise the covering. In certain embodiments, the covering may (essentially) comprise a housing wall. The housing and the covering may be attached to each other and/or sealed, to provide an essentially closed interior (hosting the electrical arrangement).

Note that terms like "top" and "bottom" do not limit the application. The (electronic) arrangement and system may be used in essentially any position, including "upside-down" configurations of the top and the bottom.

Especially, the thermally conductive element may be in thermal contact with the housing. By configuring the thermally conductive element, especially the first part in thermal contact with the housing, heat may be guided away effectively (from the thermally conductive element). The first part may in embodiments be configured to cover at least part of the one or more interior wall faces. The first part may further be configured to cover (essentially) one or more entire interior wall faces. Moreover, the first part may be configured to cover at least part of a plurality of interior wall faces. The first part may be configured to cover at least 10% of the interior housing surface area ($A_H$), such as at least 15%, especially at least 25%. The first part may further be configured to cover up to 80% of the interior housing surface area ($A_H$), such as up to 60%, especially up to 50%. Thereby, the first part may be configured to be in thermal contact with the one or more interior wall faces.

In specific embodiments, wherein the housing comprising one or more housing walls and a housing bottom, the first part may conform to the one or more housing walls and the housing bottom. Especially, the first part may be configured to conform to (i) at least part of the one or more interior wall faces and (ii) at least part of the interior bottom face. Thereby, the first part may be configured as an inlay in the housing. In such configuration, the first part may cover at least part of the interior housing surface area ($A_H$). Specifically, the first part may cover at least 25% of an interior housing surface area ($A_H$), such as at least 50%. In particular, segments of the inlay may be configured as the plurality of extensions. Thereby, such segments of the inlay may not cover the interior housing surface area ($A_H$).

The housing may in embodiments provide one or more connections for electrical wiring between the electronic arrangement and an outside power source and/or controller. The walls may in embodiments be electrically insulating. An electrically insulating element may be defined as having a dielectric strength of at least 10 $kV/cm^3$, such as at least 25 $kV/cm^3$, especially at least 50 $kV/cm^3$. The housing may in certain embodiments also be indicated as first housing. This may especially be the case for embodiments wherein the electronic arrangement is comprised by e.g., a light generating system (further described below) that comprises a second housing. In general, the term "housing" may herein refer to a first housing, unless specified otherwise.

In embodiments, heat from the electrical arrangement may (first) be absorbed by the thermally conductive element, leading to a rise in temperature of the thermally conductive element. This rise in temperature may subsequently be guided away from the thermally conductive element through thermal contact with the housing. Furthermore, in certain embodiments, the housing may be configured in thermal contact with the external environment, e.g., ambient air, allowing heat to be guided away yet further. Thus the heat from the electrical arrangement may be guided away to the external environment. Hence, the housing facilitates safe, effective and durable operation of the electronic arrangement by providing thermal conduction of heat away from electrical arrangement. Further, herein the phrase "housing in thermal contact with the thermally conductive element", and similar phrases, may in embodiments especially refer to housing, such as the walls, in physical contact with the thermally conductive element, especially the first part. Therefore, in certain embodiments, the electronic arrangement may further comprise a housing. The housing may enclose the electrical arrangement and the thermally conductive element. The first part may be configured in thermal contact with the housing. In further embodiments, the housing may comprise one or more housing walls. The one or more housing walls may comprise one or more interior wall faces. The first part may be configured to be in thermal contact with and cover at least part of the one or more interior wall faces. Moreover, in such embodiments, the housing may comprise a housing bottom. The housing bottom may comprise an interior bottom face. The support may be arranged parallel to the housing bottom. The first part may conform to (i) at least part of the one or more the interior wall faces and (ii) at least part of the interior bottom face. Especially, in such embodiments, the interior wall faces and the interior bottom face may define a first interior surface area ($A_H$). The first part may cover at least 50% of a first interior surface area ($A_H$).

The housing may especially comprise a void space, i.e., a space enclosed by the housing that is not occupied by the electrical arrangement nor by the thermally conductive element. In some embodiments, the void space may be (essentially) unoccupied. In certain embodiments, the electronic arrangement may further comprise a thermal potting material. Such thermal potting material may especially be configured within the housing such as to occupy at least part of the void space. At least 70% of the void space may be occupied by thermal potting material, such as at least 80%, especially at least 90%. The thermal potting material may be configured in thermal contact with the housing. The thermal potting material may further be configured in thermal contact with the electrical arrangement, especially with the support and/or the electrical components. The thermal potting material may yet be configured in thermal contact with one or more of the plurality of extensions. In some embodiments the thermal potting material may be configured in thermal contact with both the electrical arrangement and one or more of the plurality of extensions. The thermally potting material may be configured inside the housing in a number of different configurations to achieve (i) a high degree of void space occupation, (ii) thermal contact with other elements of the electronic arrangement, and optionally (iii) further benefits. In certain embodiments, the thermally conductive material may be provided as one or more of a conventional thermal potting material, a conventional thermal interface material, and a conventional thermal padding. Various combinations and configurations of conventional thermal potting materials may be known to the person skilled in the art.

In certain further embodiments, the thermal potting material may comprise a shell material and a filling material. The filling material may further comprise a thermally conductive filling material. The filling material may have a thermal conductivity of at least 5 W/(m*K), such as at least 10 W/(m*K), especially at least 50 W/(m*K). Thereby, the filling material may provide the thermal potting material with a high thermal conductivity and be applicable as a further means of thermal management. Especially, the filling material may comprise materials with a higher conductivity than conventional thermal potting materials (which are around ~6 W/(m*K)). The filling material may in embodiments comprise a fluid. In particular, the filling material may comprise a liquid or a powder. Especially, the filling material may comprise a thermally conductive liquid, such as a mineral oil or water solution, especially a mineral oil. In particular, the filling material may comprise silicon oil. Further, the filling material may comprise a fine particulate powder, such as a mineral powder or a ceramic powder. Especially, the filling material may comprise a mineral powder, such as a mineral powder comprising one or more of clay minerals, muscovite, quartz, calcite, and pyrite, especially quartz sand. Moreover, the filling material may comprise a ceramic powder, such as a ceramic powder comprising one or more of alumina, aluminum nitride, barium neodymium titanate, barium strontium titanates, barium tantalite, beryllia, boron nitride, cubic boron nitride, glass ceramic, and cordierite. In certain embodiments, the filling material may comprise a powder suspended in a liquid. Thereby, the filling material would comprise a material with high thermal conductivity yet be hard to contain and/or remove from an electronic arrangement due to its fluid nature.

The shell material may enclose the filling material in a shell. Especially, the shell material may form a sealed shell enclosing the filling material. The shell material may be a flexible shell material, such that the shell may take the contour of any arrangement. Thereby, the shell may be applied in various embodiments of the electronic arrangement as described herein. In particular, the shell may occupy the void space in the housing. Further, the shell material may be a non-adhesive shell material. Thereby, the shell may not adhere to other elements of the electronic arrangement. The shell material may especially comprise an elastomer, such as a rubber. In particular, the shell material may comprise one or more of silicone rubber and isoprene rubber. The shell material may thereby provide the thermal potting material with structural integrity and non-adhesive properties. Hence, the thermal potting material may be configured as a thermal management solution within the electronic arrangement easily and may further be removed easily. Thereby, such thermal potting material may be a recyclable and sustainable alternative to conventional thermal potting materials.

Such shell may have a compressed and non-compressed state. In a compressed state, the volume of the shell may be at least 5% smaller than the volume of the shell in a non-compressed state, such as at least 10% smaller, especially at least 15% smaller. The shell may be configured in the electronic arrangement in a compressed state, thereby facilitating improved thermal contact with the housing and one or more of the electric arrangement and/the thermally conductive element. Especially, the shell may be configured (in a compressed state) to cover at least part of one or more of the plurality of extensions. Further, the shell may be configured (in a compressed state) to be in thermal contact with one or more of the plurality of extensions.

Thereby, in specific embodiments, the electronic arrangement may further comprise a thermal potting material. Herein, in such embodiments, the housing may comprise a void space. At least 80% of the void space may be occupied by the thermal potting material. Further, in such embodiments, the thermal potting material may be configured in thermal contact with the housing and one or more of (a) the electrical arrangement and (b) one or more of the extensions. Moreover, in certain embodiments, the thermal potting material may comprise a shell material and a filling material. The shell material may be selected from the group comprising silicone rubber and isoprene rubber. The filling material may comprise one or more from the group comprising silicon oil, quartz sand, and ceramic powder. Especially, in particular embodiments, the thermal potting material may be configured in thermal contact with and covering at least part of one or more extensions.

In another aspect, the invention provides a light generating system comprising a light generating device. In embodiments, the light generating device may be configured to generate device light. The light generating system may in embodiments, further comprise a second housing, wherein the housing may comprise an end window via which device light may be outcoupled. The light generating system may be configured to generate system light, wherein system light may comprise the device light. Especially, the system light may escape via the end window. Further, in embodiments, the light generating system may comprise a control system. In embodiments, the control system may especially be used to control the operation of the light generating system. The light generating device may in embodiments be electrically connected to the electronic arrangement as described herein. Especially, the support may be electrically coupled to the light generating device by means of electrical wiring. Hence, in specific embodiments, the invention provides a light generating system comprising a control system, a light generating device and the electronic arrangement, wherein the support is electrically coupled to the light generating device (by means of electrical wiring), wherein the light generating device is configured to generate device light, wherein the light generating system is configured to generate system light, wherein system light comprises device light, wherein the light generating system comprises an end window, wherein the system light escapes the via the end window, and wherein the control system is configured to control the light generating device. Such system may comprise a second housing enclosing the first housing. The first housing may in embodiments host a control system or driver for the light generating device.

Yet, in embodiments the invention provides a light generating system comprising a light generating device and the electronic arrangement as defined herein, wherein the electronic arrangement may be functionally coupled to the light generating device. Especially, the electronic arrangement may be electrically coupled to the light generating device. The light generating device may comprise a light source. The term "light source" may in principle relate to any light source known in the art.

In embodiments, the light generating device may comprise a solid state light source. Especially, the electronic arrangement may be functionally coupled to the light generating device. In embodiments, the electronic arrangement may be configured as driver or controller for the light generating device. Hence, in specific embodiments, the invention provides a light generating system comprising a light generating device and the electronic arrangement, wherein the light generating device comprises a solid state light source, wherein the electronic arrangement is functionally coupled to the light generating device, and wherein the electronic arrangement is configured as driver or controller for the light generating device.

In embodiments, the solid state light source may comprise one or more of a light emitting diode, a laser diode, and a superluminescent diode. The term "light source" may also relate to a plurality of light sources, such as 2-2000 (solid state) LED light sources. Hence, the term LED may also refer to a plurality of LEDs.

The light generating system may be part of or may be applied in e.g. office lighting systems, household application systems, shop lighting systems, home lighting systems, accent lighting systems, spot lighting systems, theater lighting systems, fiber-optics application systems, projection systems, self-lit display systems, pixelated display systems, segmented display systems, warning sign systems, medical lighting application systems, indicator sign systems, decorative lighting systems, portable systems, automotive applications, (outdoor) road lighting systems, urban lighting systems, green house lighting systems, horticulture lighting, digital projection, or LCD backlighting. The light generating system (or luminaire) may be part of or may be applied in e.g. optical communication systems or disinfection systems.

The term "controlling" and similar terms especially refer at least to determining the behavior or supervising the running of an element. Hence, herein "controlling" and similar terms may e.g. refer to imposing behavior to the element (determining the behavior or supervising the running of an element), etc., such as e.g. measuring, displaying, actuating, opening, shifting, changing temperature, etc. Beyond that, the term "controlling" and similar terms may additionally include monitoring. Hence, the term "controlling" and similar terms may include imposing behavior on an element and also imposing behavior on an element and monitoring the element. The controlling of the element can be done with a control system, which may also be indicated as "controller". The control system and the element may thus at least temporarily, or permanently, functionally be coupled. The element may comprise the control system. In embodiments, the control system and element may not be physically coupled. Control can be done via wired and/or wireless control. The term "control system" may also refer to a plurality of different control systems, which especially are functionally coupled, and of which e.g. one control system may be a master control system and one or more others may be slave control systems. A control system may comprise or may be functionally coupled to a user interface.

The control system may also be configured to receive and execute instructions from a remote control.

In embodiments, the control system may control in dependence of one or more of an input signal of a user interface, a sensor signal (of a sensor), and a timer. The term "timer" may refer to a clock and/or a predetermined time scheme.

In yet a further aspect, the invention also provides a lamp or a luminaire comprising the light generating system as defined herein. The luminaire may further comprise a housing, optical elements, louvres, etc. etc. The lamp or luminaire may further comprise a housing enclosing the light generating system. The lamp or luminaire may comprise a light window in the housing or a housing opening, through which the system light may escape from the housing. In yet a further aspect, the invention also provides a projection device comprising the light generating system as defined herein. Especially, a projection device or "projector" or "image projector" may be an optical device that projects an image (or moving images) onto a surface, such as e.g. a projection screen. The projection device may include one or more light generating systems such as described herein. Hence, in an aspect the invention also provides a light generating device selected from the group of a lamp, a luminaire, a projector device, a disinfection device, a photochemical reactor, an automotive lighting device, and an optical wireless communication device, comprising the light generating system as defined herein. The light generating device may comprise a housing or a carrier, configured to house or support, one or more elements of the light generating system.

In a further aspect, the invention provides a method of assembly of the electronic arrangement as described herein. The method may in general comprise assembling the electrical arrangement and the thermally conductive element. Especially, the method may comprise configuring the thermally conductive element, especially the plurality of extensions, to be in thermal contact with the electrical arrangement, especially the one or more electrical component tops. In particular, the method may comprise first configuring the thermally conductive element, especially the first part, in or on the electronic arrangement. The method may then comprise configuring the plurality of extensions at first angles ($\alpha_1$) with the first part, such that the plurality of extensions extend from the first part. The plurality of extensions may especially be configured to be in thermal contact with one or more electrical component tops.

In specific embodiments, the method of assembly may comprise configuring the plurality of extensions in thermal contact with two or more electrical component tops. Moreover, at least one extension of the plurality of extensions may be configured to extend from the first part along an axis of elongation ($A_E$), wherein the axis of elongation ($A_E$) has a second angle ($\alpha_2$) relative to the first part. In some embodiments, the at least one extension may comprise creasing a crease area or bending a bent area to achieve the second angle ($\alpha_2$).

In further embodiments, the method of assembly may comprise enclosing the electrical arrangement and the thermally conductive element in a first housing. Especially, the first part may be configured in thermal contact with the housing, especially at least part of the one or more interior wall faces. In yet further embodiments, the method of assembly may comprise a further step configuring a thermal potting material to occupy the void space within the housing. Such thermal potting material may especially be configured to be in thermal contact with the housing, the electrical arrangement, and/or one or more of the plurality of extensions. The thermal potting material may in certain embodiments be arranged in the housing to apply pressure on the plurality of extensions. Especially, the thermal potting material may first be placed in the housing in a non-compressed state. As the housing is closed or sealed, the thermal potting material may enter a compressed state. Hence, the thermal potting material in a compressed state may apply more pressure on the plurality of extensions, and the thermal contact may thereby be improved.

BRIEF DESCRIPTION OF THE DRAWINGS

Embodiments of the invention will now be described, by way of example only, with reference to the accompanying schematic drawings in which corresponding reference symbols indicate corresponding parts, and in which.

The schematic drawings are not necessarily to scale.

DETAILED DESCRIPTION OF THE EMBODIMENTS

Figure 1:
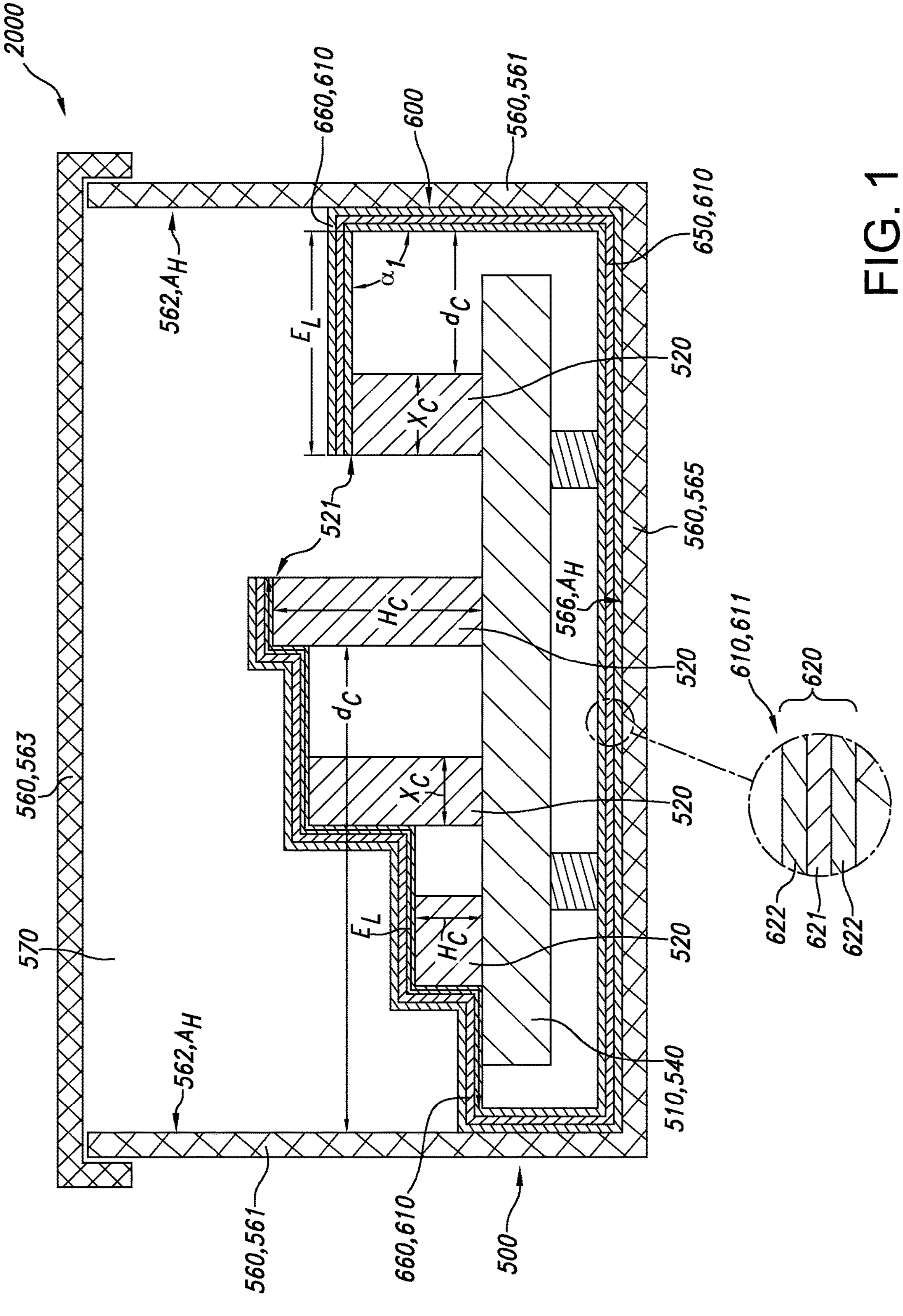
FIG. 1 schematically depicts a cross-sectional view of the electronic arrangement.

FIG. 1 schematically depicts a cross-sectional view of an electronic arrangement 2000 comprising an electrical arrangement 500 and a thermally conductive element 600. In embodiments, the electrical arrangement 500 may comprise a support 510 and a plurality of electrical components 520 supported by the support 510. Each of the plurality of electrical components 520 may especially have an electrical component top 521 defining a component height $H_C$ relative to the support 510. Further, the thermally conductive element 600 may comprise a first part 650 and a plurality of extensions 660, extending from the first part 650 and configured under first angles $\alpha_1$ with the first part 650. The first angles $\alpha_1$ may be selected from the range of 75-105°, especially 90° as depicted in FIG. 1. However, other first angles are herein not excluded. The first part 650 and the plurality of extensions 660 may in particular comprise a thermally conductive sheet-like element 610. The thermally conductive sheet-like element 610 may comprise one or more thermally conductive layers 620. In embodiments, the plurality of extensions 660 may be configured in thermal contact with one or more electrical component tops 521.

Especially, FIG. 1 depicts embodiments wherein the thermally conductive sheet-like element 610 may comprise a thermally conductive foil 611. The thermally conductive foil 611 may further comprise at least three thermally conductive layers 620 comprising one or more inner layers 621 and two outer layers 622 sandwiching the one or more inner layers 621. The one or more inner layers 621 may in particular have a thermal conductivity of at least 80 W/(m*K). In specific embodiments, the one or more inner layers 621 may comprise one or more of (i) a carbon material, (ii) a copper material, (iii) a boron material, and (iv) an aluminum material. In further embodiments, the two outer layers 622 may comprise a thermoplastic polymer material, especially a polyimide film.

In embodiments, the plurality of electrical components 520 may be arranged on the support 510 at a component distance de from the first part 650. Further, the plurality of electrical components 520 may have at least one component dimension $X_C$. The plurality of extensions 660 may especially have an extension length $L_E$ from the first part 650. Therefore in embodiments; $d_C<L_E\leq d_C+H_C+X_C$.

In further such embodiments, one or more of the plurality of extensions 660 may be configured in thermal contact with two or more electrical component 520. In particular, the electrical component tops 521 of two or more electrical components 520 may be configured in thermal contact with the same extension 660. The two or more electrical components 520 may especially be arranged in the order of increasing component height $H_C$ with increasing component distance de from the first part 650. While not depicted in FIG. 1, other configurations may be possible, such as (i) wherein the two or more electrical components 520 are arranged in the order of decreasing increasing component height $H_C$ with increasing component distance $d_C$ from the first part 650, or (ii) wherein the two or more electrical components 520 are arranged in the order of equal component height $H_C$ with increasing component distance $d_C$ from the first part 650.

Especially, FIG. 1 may depict an electronic arrangement 2000 further comprising a housing 560. The housing 560 may in embodiments enclose the electrical arrangement 500 and the thermally conductive element 600. The first part 650 may especially be configured in thermal contact with the housing 560. Further, the housing 560 may in embodiments comprise a void space 570.

Moreover, in embodiments, the housing 560 may comprise one or more housing walls 561. The one or more housing walls 561 may further comprise one or more interior wall faces 562. The first part 650 may especially be configured to be in thermal contact with and cover at least part of the one or more interior wall faces 562.

Further, the housing 560 may comprise a housing bottom 565. The housing bottom 565 may in particular comprise an interior bottom face 566. The support 510 may in embodiments be arranged parallel to the housing bottom 565. The first part 650 may especially conform as an inlay 651 to (i) at least part of the one or more interior wall faces 562 and (ii) at least part of the interior bottom face 566. The interior wall faces 562 and the interior bottom face 566 may further define an interior housing surface area $A_H$. The first part 650 may especially cover at least 50% of an interior housing surface area $A_H$.

Further, the housing 560 may comprise a housing lid 563.

In embodiments, the support 510 may especially comprise a printed circuit board 540. The plurality of electrical components 520 may be electrically coupled to the printed circuit board 540. One or more of the plurality of electrical components 520 may be selected from the group comprising a capacitor, an inductor, a voltage regulator, an amplifier circuit, an integrated circuit, a central processing unit, a microprocessor unit, a FET, a MOSFET, a transformer, a resistor, a diode, a sensor, and a transistor.

Figure 2:
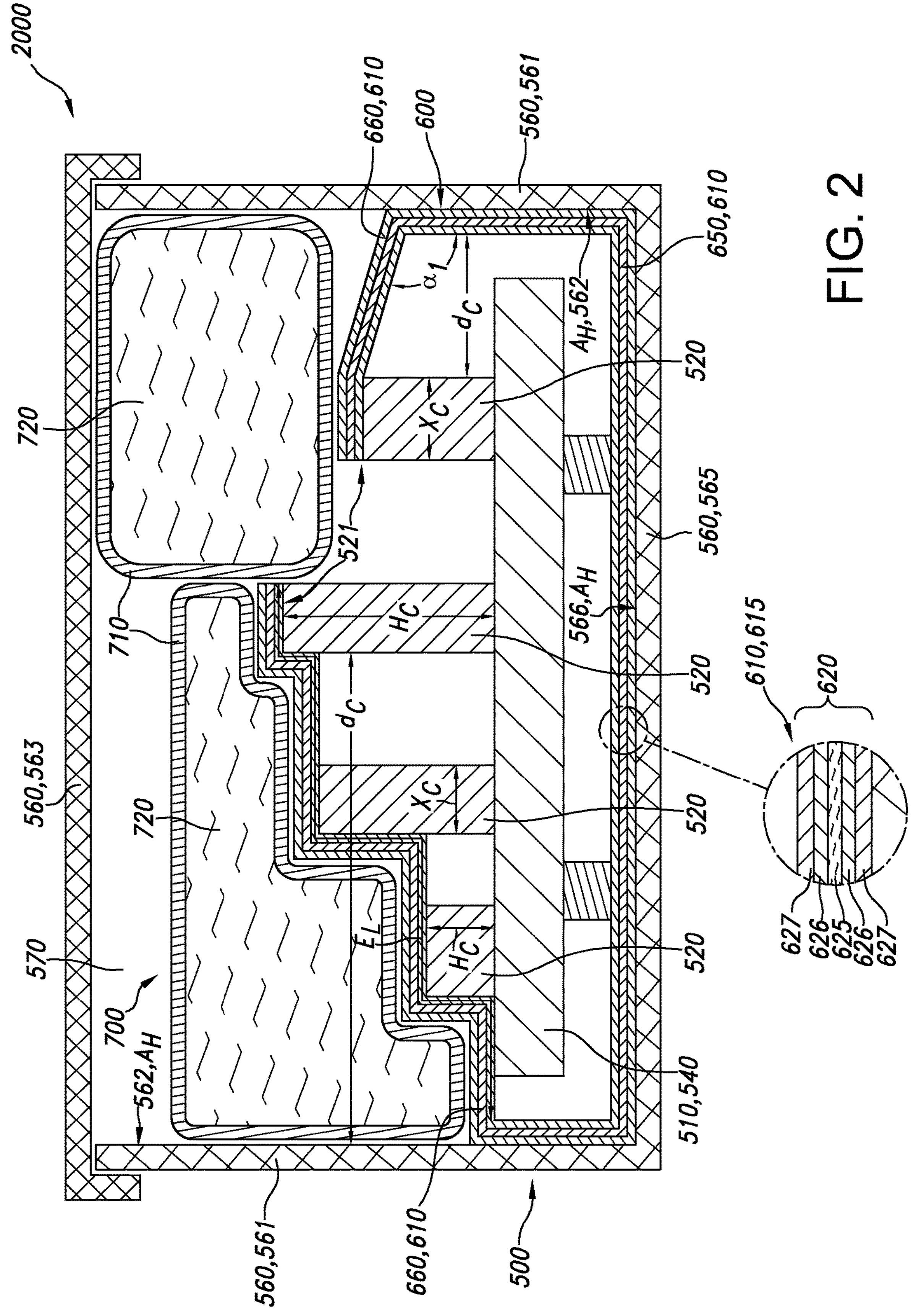
FIG. 2 schematically depicts a cross-sectional view of further embodiments of the electronic arrangement.

FIG. 2 schematically depicts a cross-sectional view of further embodiments of an electronic arrangement 2000 comprising an electrical arrangement 500 and a thermally conductive element 600. The first angles $\alpha_1$ may e.g. be selected from the range of 75-105°.

Especially, in such embodiments, the thermally conductive sheet-like element 610 may comprise a vapor chamber 615. The vapor chamber 615 may comprise two thermally conductive layers 620 comprising two envelope layers 627. The vapor chamber may further comprise a working fluid 625 and one or more wick structures 626. Especially, the two envelope layers 627 may enclose the working fluid 625 and the one or more wick structures 626. In particular, the working fluid 625 may have a boiling point selected from the range of 55-105° C. Further, the one or more wick structures 625 may have a thermal conductivity of at least 80 W/(m*K).

In further such embodiments, the working fluid 625 may comprise one or more of (i) water, (ii) ethanol, (iii) methanol, and (iv) acetone. Especially, the one or more wick structures 626 may comprise one or more of (i) a powder, such as a sintered powder, (ii) a foam, (iii) a grooved wick, (iv) a planar mesh, and (v) a spiral mesh. The two envelope layers 627 may in embodiments comprise one or more of (i) a copper material, (ii) an aluminum material, and (iii) a titanium material.

Further depicted in FIG. 2 are embodiments comprising a thermal potting material 700. At least 80% of the void space 570 may be occupied by the thermal potting material 700. The thermal potting material 700 may especially be configured in thermal contact with the housing 560 and one or more of (a) the electrical arrangement 500 and (b) one or more of the plurality of extensions 660. In particular, the thermal potting material 700 may be configured to be in thermal contact with and cover at least part of one or more extensions 660.

In further such embodiments, the thermal potting material 700 may comprise a shell material 710 and a filling material 720. The shell material 710 may especially be a non-adhesive shell material 710. The filling material 720 may in particular be a thermally conductive filling material 720. The shell material 710 may especially be selected from the group comprising silicone rubber and isoprene rubber. The filling material 720 may further comprise one or more from the group comprising silicon oil, quartz sand, and ceramic powder.

Figure 3:
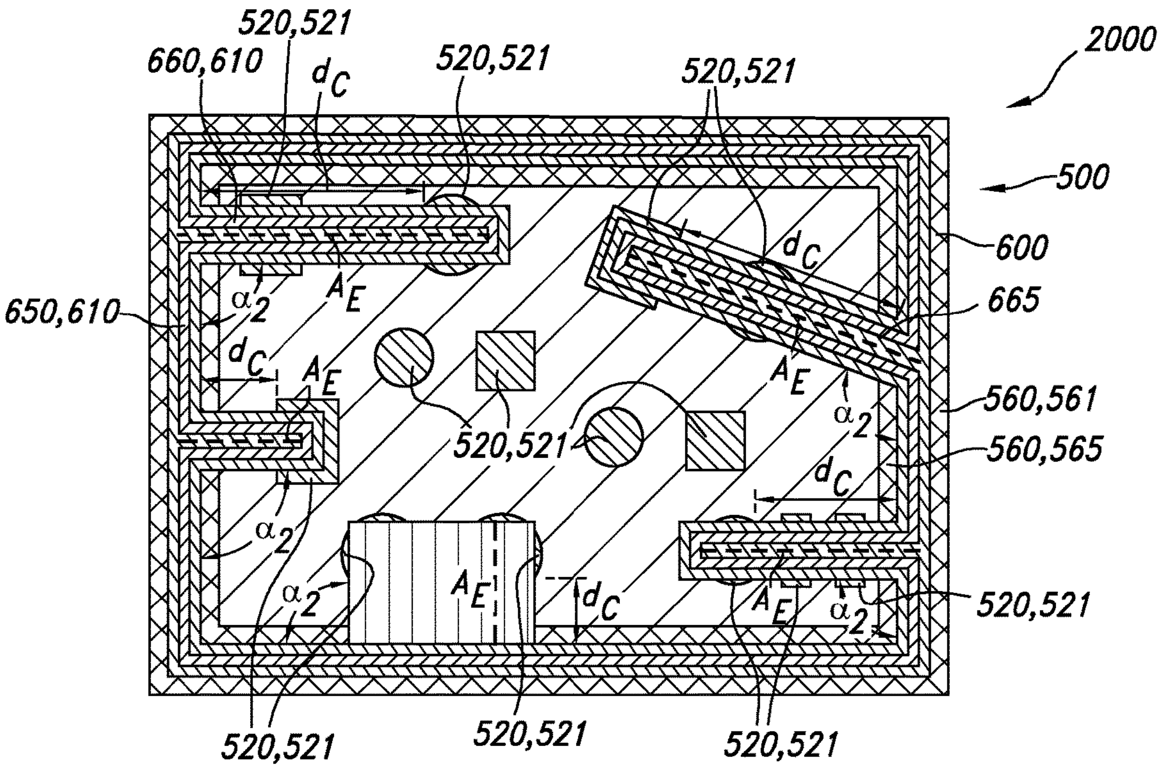
FIG. 3 schematically depicts a top-down view of the electronic arrangement.
Figure 4:
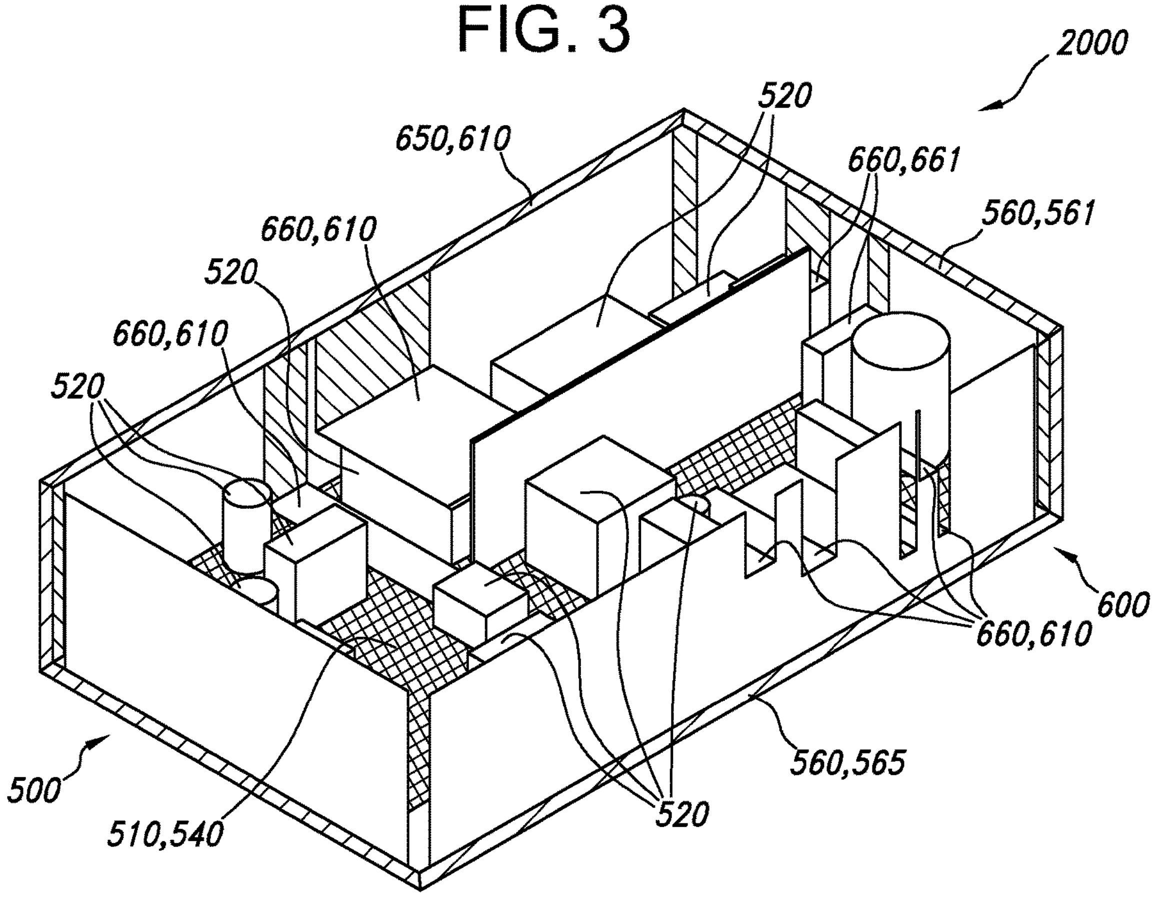
FIG. 4 schematically depicts a diagonal view of the electronic arrangement.

FIG. 3 schematically depicts a top-down view of the electronic arrangement 2000. FIG. 4 schematically depicts a diagonal view of the electronic arrangement 2000. Hereby, the arrangement of the thermally conductive element 600 relative to the electrical arrangement 500 may be clarified with these views of the electronic arrangement 2000.

In particular, FIG. 3 depicts an embodiment wherein at least one extension 660 of the plurality of extensions 660 may extend from the first part 650 along an axis of elongation $A_E$. The axis of elongation $A_E$ may have a second angle $\alpha_2$ relative to the first part 650. The second angles $\alpha_2$ may be selected from the range of 45-135°, such as 65-115°, especially 85-95°. If the second angle $\alpha_2$ of an extension is not (substantially) 90°, the at least one extension may be provided with a crease or bent area 665. Especially, a subset of the plurality of electrical components 520 may be arranged on the support 510 along the axis of elongation $A_E$. Further, the electrical component tops 521 of the subset of electrical components 520 may be configured in thermal contact with the at least one extensions 660.

Figure 5:
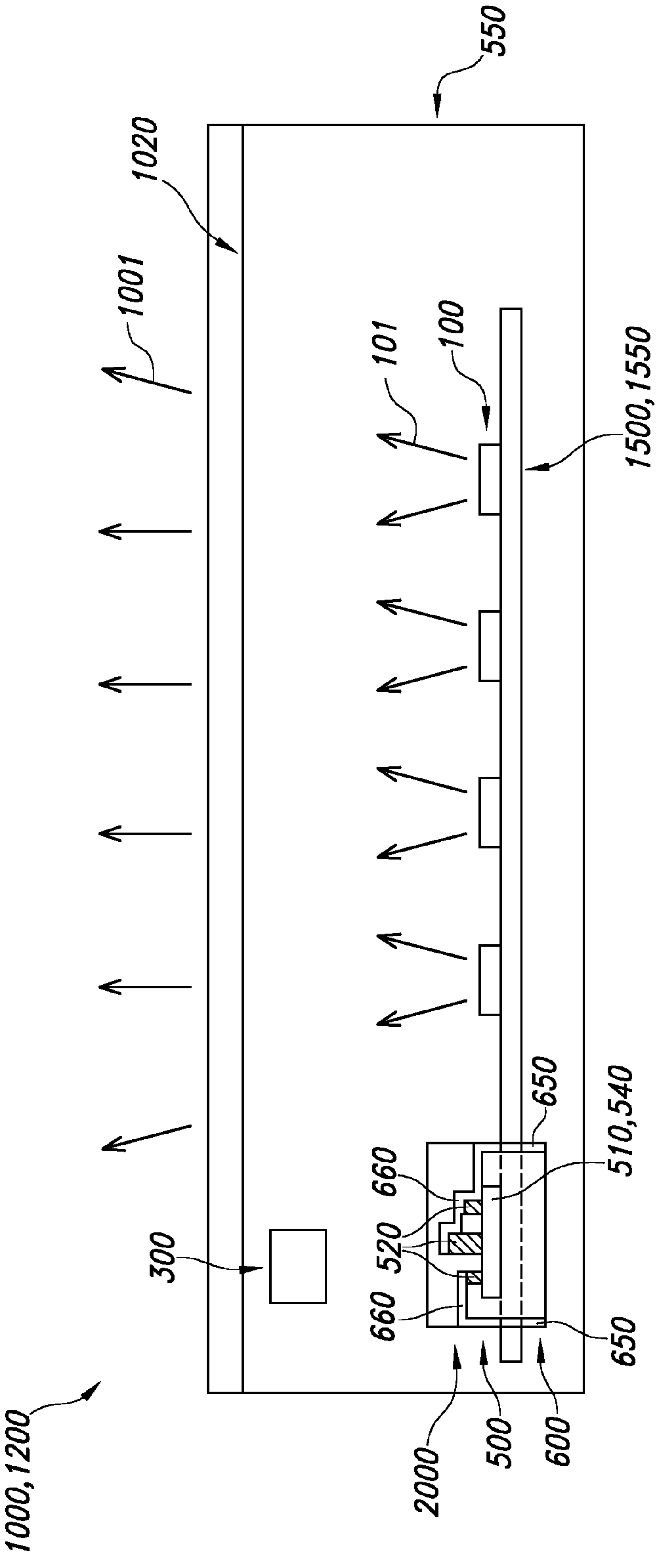
FIG. 5 schematically depicts a cross-section of the light generating system comprising the electronic arrangement.

FIG. 5 shows the cross-section of an embodiments of a light generating system 1000. As mentioned before, in an aspect, the invention provides the light generating system 1000 comprising the electronic arrangement 2000. The light generating system 1000 may comprise a light generating device 100. In embodiments, the light generating device 100 may comprise a solid state light source 10. Especially, the electronic arrangement 2000 may be functionally coupled to the light generating device 100. In embodiments, the electronic arrangement 2000 may be configured as a driver or a controller for the light generating device 100(*s*). Especially, the solid state light source 10 may comprise one or more of a light emitting diode and a laser diode. More especially, the solid state light source may comprise a superluminescent diode.

In embodiments, the light generating system 1000 may be configured to generate system light 1001. Especially, the system light 1001 may comprise the device light 101. Further, in embodiments, the light generating system 1000 may comprise a second housing 550. The light generating system 1000 may comprise a support arrangement 1500, comprising a light generating device support 1550. Especially, the light generating device support 1550 may be (functionally) coupled to the second housing 550 or the second housing 550 may comprise the light generating device support 1550. In embodiments, the light generating device 100 may be electrically coupled to the light generating device support 1550, wherein the light generating devices 100 are configured on the part of the light generating device support 1550 that extends outside the (first) housing 560.

In such embodiments as depicted, the electronic arrangement 2000 may comprise an electrical arrangement 500 and a thermally conductive element 600. In embodiments, the electrical arrangement 500 may comprise a support 510 and a plurality of electrical components 520 supported by the support 510. Further, the thermally conductive element 600 may comprise a first part 650 and a plurality of extensions 660, extending from the first part 650. In embodiments, the plurality of extensions 660 may be configured in thermal contact with one or more electrical components 520.

In embodiments, the housing 1030 may comprise one or more walls and an exit window 1020. Especially, the exit window 1020 may be configured downstream of the one or more light generating devices 100. More especially, the electronic arrangement 2000 may be configured to provide system light 1001 via the exit window 1020. The terms "upstream" and "downstream" relate to an arrangement of items or features relative to the propagation of the light from a light generating means (here the especially the light source), wherein relative to a first position within a beam of light from the light generating means, a second position in the beam of light closer to the light generating means may be "upstream", and a third position within the beam of light further away from the light generating means may be "downstream".

In the embodiment depicted, the light generating devices 100 may generate device light 101. The system light 1001 may especially comprise the device light 101 and may escape via the exit window 1020.

Furthermore, the light generating system 1000 may comprise a control system 300. Especially, the control system 300 may be configured to control the light generating device 100.

Figure 6:
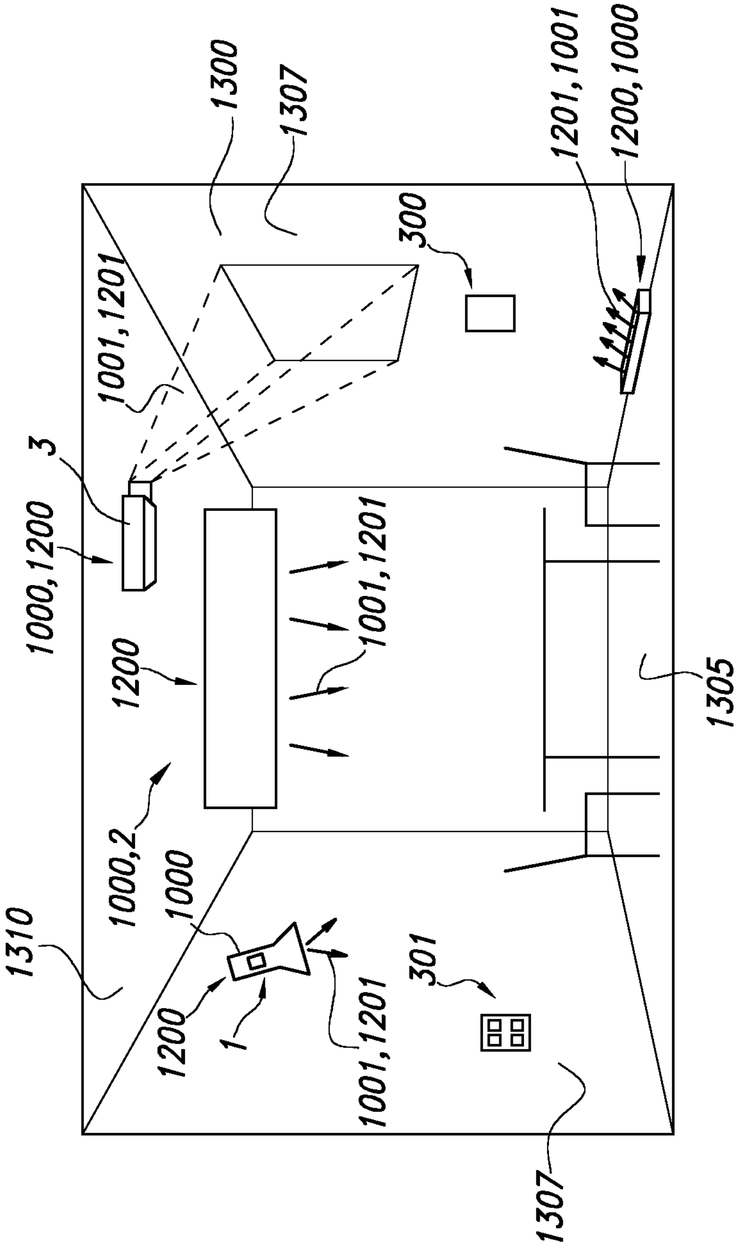
FIG. 6 schematically depicts embodiments of the lighting device comprising the light generating system.

FIG. 6 schematically depicts embodiments of a luminaire 2 comprising the light generating system 1000 as described above. Reference 301 indicates a user interface which may be functionally coupled with the control system 300 comprised by or functionally coupled to the light generating system 1000. Hence, FIG. 3 schematically depicts embodiments of a lighting device 1200 selected from the group of a lamp 1, a luminaire 2, a projector device 3, a disinfection device, a photochemical reactor, an automotive lighting device, and an optical wireless communication device, comprising the light generating system 1000 as described herein. In embodiments, such lighting device may be a lamp 1, a luminaire 2, a projector device 3, a disinfection device, or an optical wireless communication device. Lighting device light escaping from the lighting device 1200 may be indicated with reference 1201. Lighting device light 1201 may essentially consist of system light 1001, and may in specific embodiments thus be system light 1001. In embodiments, the light generating device 1200 may be configured provide system light 1001 on one or more surfaces in a room 1300. Especially, the light generating system 1000 may illuminate the walls 1307, or the floor 1305, or the ceiling 1310 in a room 1300.

Thermal simulation experiments were carried out on electrical arrangements 500 comprising a PCB 540 functionally coupled to one or more electrical components 520. The one or more electrical components 520 were configured in thermal contact with: (i) a plurality of extensions 660 comprised by a thermally conductive element 600, or (ii) no thermally conductive element 600. Temperatures of the one or more electrical components 520 on the electrical arrangement 500 were measured and compared.

The results of thermal experiments carried out on the electrical components 520 in thermal contact with the thermally conductive element 600 configured as a first part 650 and a plurality of extensions 660 resulted in an average temperature decrease of at least 6° C. across the electrical components 520 compared to the same electrical components 520 without the thermally conductive element 600. Thermal simulation experiments showed that an average temperature decrease of at least 10° C. may be achieved. Such a temperature decrease may result in an increased lifespan and performance from the one or more electrical components 520.

The term "plurality" refers to two or more.

The terms "substantially" or "essentially" herein, and similar terms, will be understood by the person skilled in the art. The terms "substantially" or "essentially" may also include embodiments with "entirely", "completely", "all", etc. Hence, in embodiments the adjective substantially or essentially may also be removed. Where applicable, the term "substantially" or the term "essentially" may also relate to 90% or higher, such as 95% or higher, especially 99% or higher, even more especially 99.5% or higher, including 100%.

The term "comprise" also includes embodiments wherein the term "comprises" means "consists of".

The term "and/or" especially relates to one or more of the items mentioned before and after "and/or". For instance, a phrase "item 1 and/or item 2" and similar phrases may relate to one or more of item 1 and item 2. The term "comprising" may in embodiments refer to "consisting of" but may in another embodiment also refer to "containing at least the defined species and optionally one or more other species".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices, apparatus, or systems may herein amongst others be described during operation. As will be clear to the person skilled in the art, the invention is not limited to methods of operation, or devices, apparatus, or systems in operation.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim.

Use of the verb “to comprise” and its conjugations does not exclude the presence of elements or steps other than those stated in a claim. Unless the context clearly requires otherwise, throughout the description and the claims, the words “comprise”, “comprising”, and the like are to be construed in an inclusive sense as opposed to an exclusive or exhaustive sense; that is to say, in the sense of “including, but not limited to”.

The article “a” or “an” preceding an element does not exclude the presence of a plurality of such elements.

The invention may be implemented by means of hardware comprising several distinct elements, and by means of a suitably programmed computer. In a device claim, or an apparatus claim, or a system claim, enumerating several means, several of these means may be embodied by one and the same item of hardware. The mere fact that certain measures are recited in mutually different dependent claims does not indicate that a combination of these measures cannot be used to advantage. In yet a further aspect, the invention (thus) provides a software product, which, when running on a computer is capable of bringing about (one or more embodiments of) the method as described herein.

The invention also provides a control system that may control the device, apparatus, or system, or that may execute the herein described method or process. Yet further, the invention also provides a computer program product, when running on a computer which is functionally coupled to or comprised by the device, apparatus, or system, controls one or more controllable elements of such device, apparatus, or system.

The invention further applies to a device, apparatus, or system comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Further, the person skilled in the art will understand that embodiments can be combined, and that also more than two embodiments can be combined. Furthermore, some of the features can form the basis for one or more divisional applications.

The invention claimed is:

1. An electronic arrangement comprising an electrical arrangement and a thermally conductive element; wherein:

the electrical arrangement comprises a support and a plurality of electrical components supported by the support, wherein each of the plurality of electrical components has an electrical component top defining a component height relative to the support; and the thermally conductive element comprises a first part and a plurality of extensions, extending from the first part and configured under first angles with the first part, wherein the first part and the plurality of extensions comprise a thermally conductive sheet-like element, wherein the thermally conductive sheet-like element comprises one or more thermally conductive layers; wherein the plurality of extensions are configured in thermal contact with one or more electrical component tops; and wherein the thermally conductive sheet-like element comprises a vapor chamber comprising two thermally conductive layers comprising two envelope layers; wherein the vapor chamber further comprises a working fluid and one or more wick structures, wherein the two envelope layers enclose the working fluid and the one or more wick structures.

2. The electronic arrangement according to claim 1, wherein the thermally conductive sheet-like element comprises a thermally conductive foil comprising at least three thermally conductive layers comprising one or more inner layers and two outer layers sandwiching the one or more inner layers, and wherein the one or more inner layers have a thermal conductivity of at least 80 W/(m*K).

3. The electronic arrangement according to claim 1, wherein the plurality of electrical components are arranged on the support at a component distance from the first part, wherein the plurality of electrical components have at least one component dimension ($X_C$), wherein the plurality of extensions have an extension length ($L_E$) from the first part, and wherein $d_C<L_E\leq d_C+H_C+X_C$.

4. The electronic arrangement according to claim 3, wherein one or more of the plurality of extensions are configured in thermal contact with two or more electrical component, wherein the two or more electrical components configured in thermal contact with the same extension are arranged with increasing component height along increasing component distance from the first part.

5. The electronic arrangement according to claim 1, wherein at least one extension of the plurality of extensions extends from the first part along an axis of elongation, wherein the axis of elongation has a second angle relative to the first part, and wherein a subset of the plurality of electrical components are arranged on the support along the axis of elongation and are configured in thermal contact with the at least one extensions.

6. The electronic arrangement according to claim 1, further comprising a housing, wherein the housing encloses the electrical arrangement and the thermally conductive element, and wherein the first part is configured in thermal contact with the housing.

7. The electronic arrangement according to claim 6, wherein the housing comprises one or more housing walls, wherein the one or more housing walls comprise one or more interior wall faces, and wherein the first part is configured to cover at least part of the one or more interior wall faces.

8. The electronic arrangement according to claim 7, wherein the housing comprises a housing bottom, wherein the housing bottom comprises an interior bottom face, wherein the support is arranged parallel to the housing bottom, wherein the first part conforms to at least part of the one or more interior wall faces and at least part of the interior bottom face, wherein the interior wall faces; and the interior bottom face define a interior housing surface area, and wherein the first part covers at least 50% of an interior housing surface area.

9. The electronic arrangement according to claim 1, wherein the support comprises a printed circuit board, wherein the plurality of electrical components are electrically coupled to the printed circuit board; and wherein one or more of the plurality of electrical components are selected from the group comprising a capacitor, an inductor, a voltage regulator, an amplifier circuit, an integrated circuit, a central processing unit, a microprocessor unit, a FET, a MOSFET, a transformer, a resistor, a diode, a sensor, and a transistor.

10. The electronic arrangement according to claim 3, further comprising a thermal potting material, wherein the housing comprises a void space, wherein at least 80% of the void space is occupied by the thermal potting material, and wherein the thermal potting material is configured in thermal contact with the housing and one or more of the electrical arrangement and one or more of the plurality of extensions.

11. The electronic arrangement according to claim 10, wherein the thermal potting material comprises a shell material and a filling material, wherein the shell material is selected from the group comprising silicone rubber and isoprene rubber, and wherein the filling material comprises one or more from the group comprising silicon oil, quartz sand, and ceramic powder.

12. A light generating system comprising (i) a light generating device and (ii) the electronic arrangement according to claim 1, wherein the light generating device comprises a solid state light source, wherein the electronic arrangement is functionally coupled to the light generating device, and wherein the electronic arrangement is configured as a driver or a controller for the light generating device.

13. A lighting device selected from the group of a lamp, a luminaire, a projector device, a disinfection device, a photochemical reactor, an automotive lighting device, and an optical wireless communication device, comprising the light generating system according to claim 12.

14. A method of assembly of the electronic arrangement according to claim 1, comprising: assembling the electrical arrangement and the thermally conductive element such that the plurality of extensions are configured in thermal contact with one or more electrical component tops, to provide the electronic arrangement.

* * * * *